July 7, 1959
N. L. BASSIN
2,894,097
ELECTRICAL JUNCTION BOX AND ELECTRICAL
FUSED PLUG CONNECTIONS
Filed Sept. 17, 1956
3 Sheets-Sheet 1
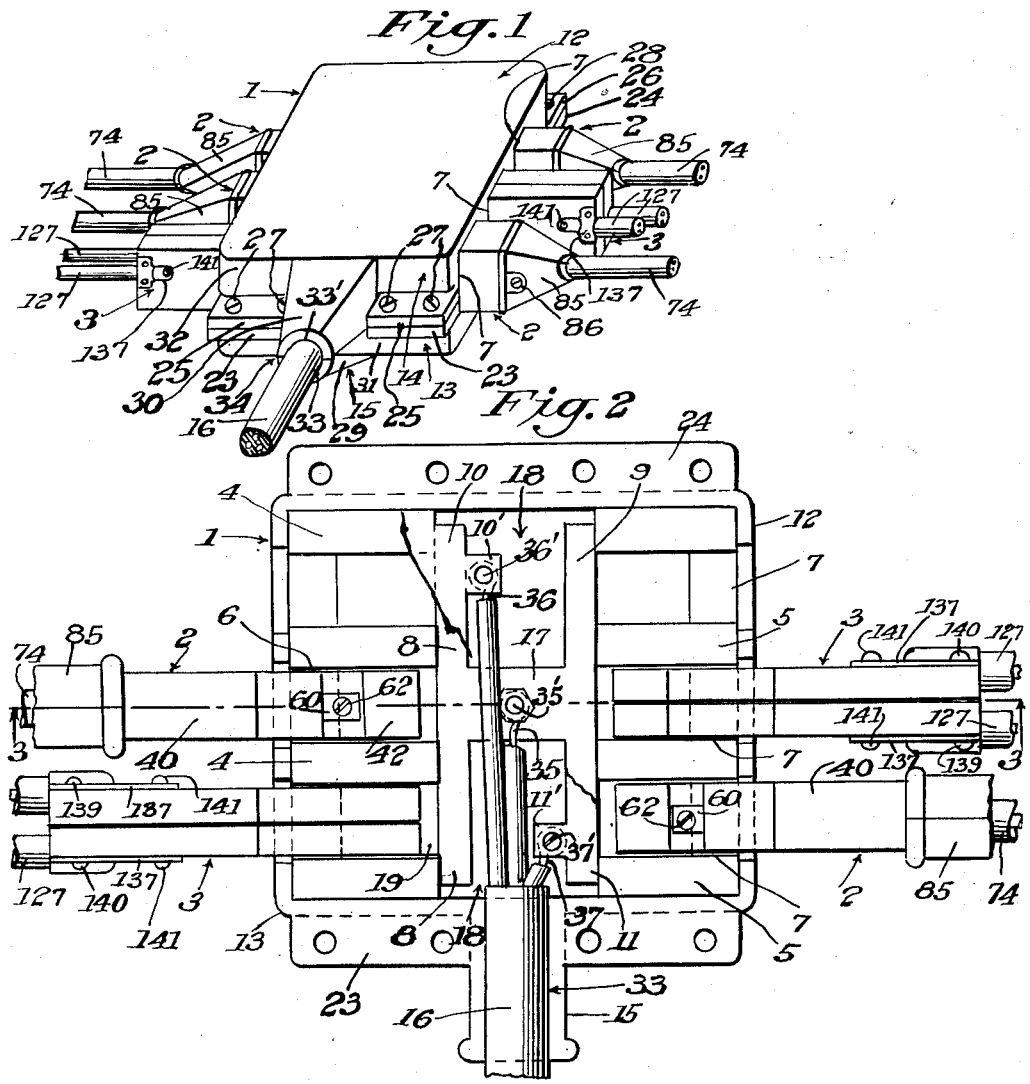
INVENTOR.
Norman L. Bassin,
BY
Alan Franklin,
ATTORNEY.

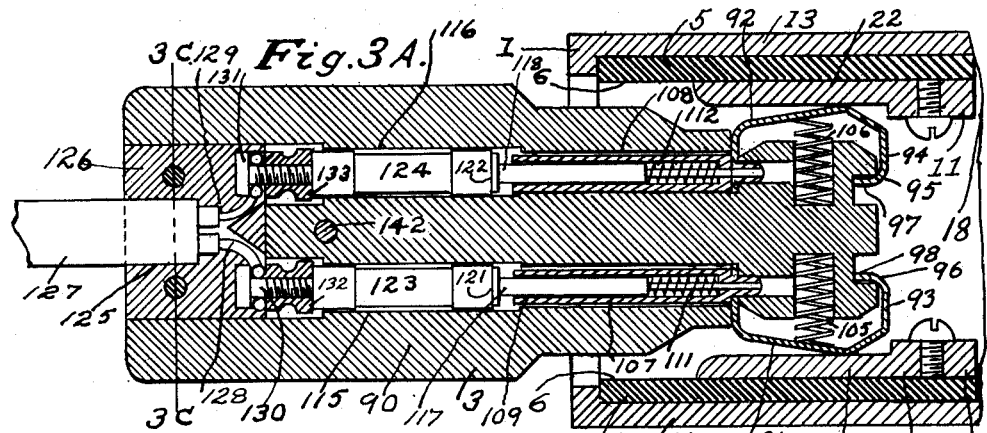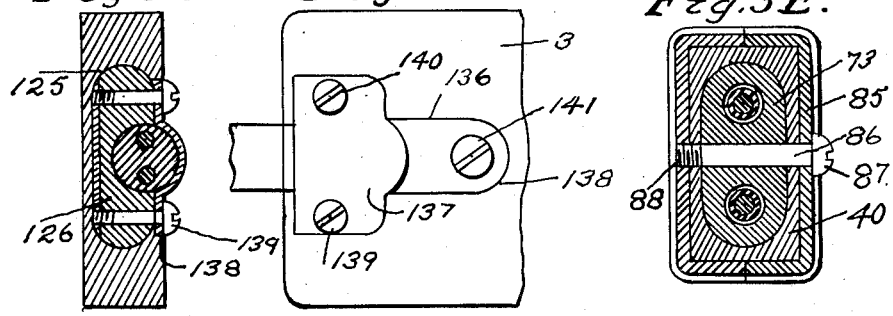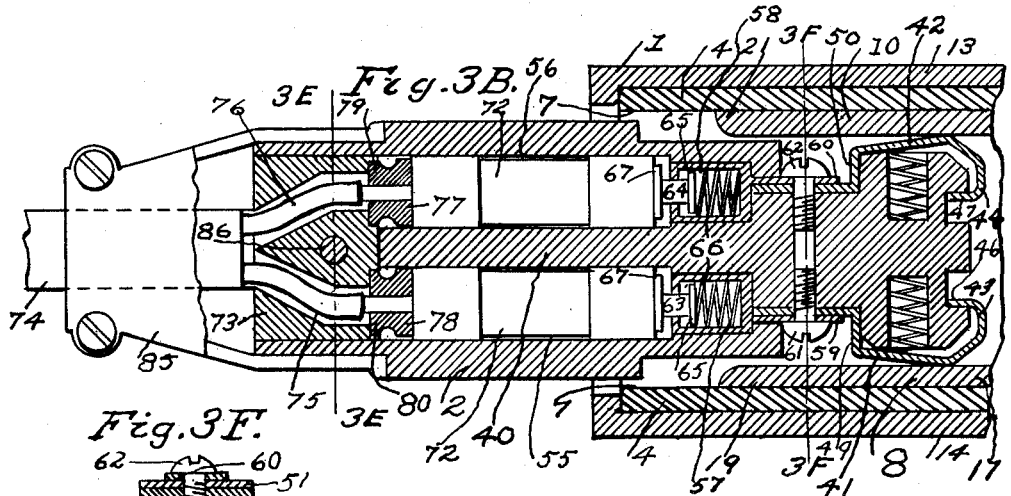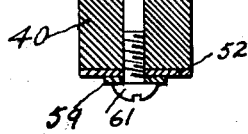

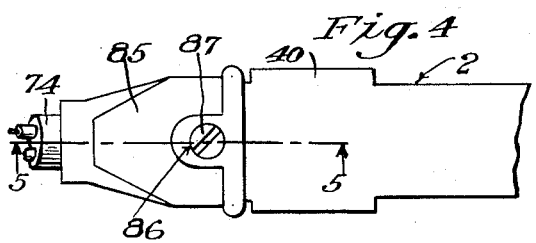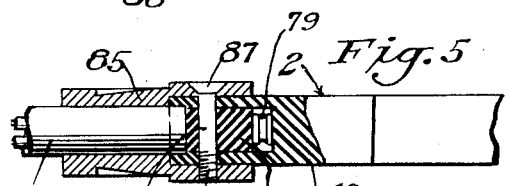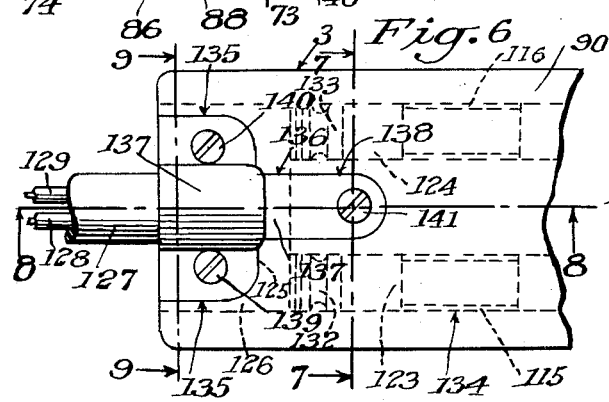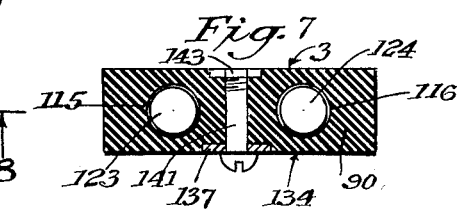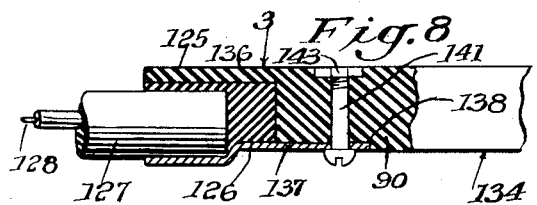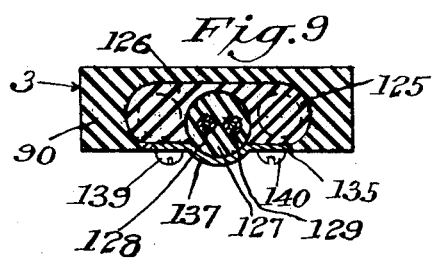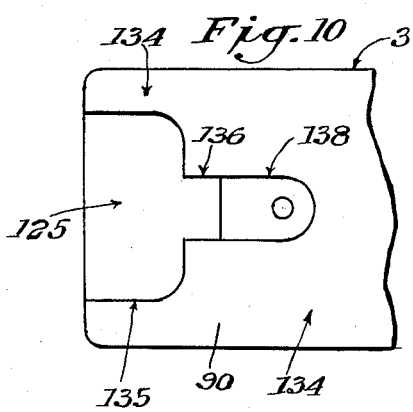

United States Patent Office 2,894,097
Patented July 7, 1959

2,894,097

ELECTRICAL JUNCTION BOX AND ELECTRICAL FUSED PLUG CONNECTIONS

Norman L. Bassin, Los Angeles, Calif.

Application September 17, 1956, Serial No. 610,052

3 Claims. (Cl. 200—115.5)

This invention relates to electrical junction boxes, and electrical fused plug connections for such junction boxes of electrical circuits, such as the lighting circuits of motion picture studios.

The general object of the invention is to provide an improved simple and highly efficient electrical fused plug connection for motion picture studio lighting circuits, which may be readily plugged into an electrical junction box.

A more particular object is to provide an electrical plug connection of the character stated for electrical junction boxes, by means of which more positive and dependable electrical connections are effected.

Another object is to provide an electrical fused connection plug of the character stated, which may more readily be taken apart for repairs and the like and reassembled for further use.

A further object is to provide an electrical plug connection of the character stated, whereby the essential elements of the plug may be detachably secured in position on the plug by only one screw, thus eliminating the use of additional screws or more complicated structure for securing the essential elements of the plug in position thereon for use.

Other objects and advantages of my invention will appear hereinafter as this specification progresses.

The invention is illustrated in the annexed drawing forming a part of this specification, in which:

Fig. 1 is a perspective of my improved junction box and electrical connection plugs.

Fig. 2 is a plan view of Fig. 1 of the upper section of the junction box removed.

Fig. 3A and Fig. 3B are enlarged and separated views in longitudinal vertical section on the line 3—3 of Fig. 2. Fig. 3C is a sectional view on the line 3C—3C of Fig. 3A. Fig. 3D is a fragmentary plan view of the outer side of the thin plug shown in Fig. 6. Fig. 3E is a cross-sectional view on the line 3E—3E of Fig. 3B. Fig. 3F is a sectional view on the line 3F—3F of Fig. 3B, the surrounding casing, insulation, and contact plates being omitted for clarity.

Fig. 4 is a fragmentary side elevation of the rear end portion of one of the thicker plugs.

Fig. 5 is an edge view of Fig. 4.

Fig. 6 is a fragmentary outer side elevation of the rear end portion of one of the thin plugs.

Fig. 7 is a cross section of Fig. 6 taken on line 7—7 of Fig. 6.

Fig. 8 is a longitudinal section of Fig. 6 taken on line 8—8 of Fig. 6.

Fig. 9 is a cross section of Fig. 6 taken on line 8—8 of Fig. 6.

Fig. 10 is a fragmentary outer side view of the thin plug shown in Fig. 6, with the rear end insulation block and conductor cable connected thereto removed from the rear end of the plug.

Referring more particularly to the drawing, in which the same parts are designated by the same reference numerals in all of the views of the drawing, my invention includes an electrical junction box 1, single thick plugs 2, and pairs of double thin plugs 3, which plugs are adapted to be plugged into opposite sides of said junction box in the manner and for the purpose hereinafter more fully and particularly described.

The junction box 1 includes two plug insulation blocks 4 and 5, provided, respectively, with laterally spaced plug receiving openings 6 and 7, extending transversely through said blocks 4 and 5, respectively, a pair of connected lower buss bars 8 and 9 for conducing electric current to the lower sides of said plug-receiving openings 6 and 7 of said insulation blocks 4 and 5, respectively, a pair of unconnected upper buss bars 10 and 11 for conducting electric current to the upper sides of said plug-receiving openings 6 and 7 of said insulation blocks 4 and 5, respectively, a casing 12 enclosing said plug insulation blocks 4 and 5 and said buss bars 8 to 11, inclusive, which casing is made in two detachably connected sections 13 and 14 and is formed with an electric cable inlet duct 15 through which duct is extended an electric conductor cable 16 into said casing 12 for connecting to said buss bars 8 to 11, inclusive, in the manner and for the purpose hereinafter more fully described.

The lower buss bars 8 and 9 are connected intermediate their ends by a connecting member 17. The buss bars 8 to 11, inclusive, are located within a space 18 between the inner sides of the plug blocks 4 and 5, the lower buss bars 8 and 9 being located adjacent the lower inner ends of the plug openings 6 and 7 of the plug blocks 4 and 5, respectively, and the upper buss bars 10 and 11 being located adjacent the upper inner ends of said plug openings 6 and 7 of said plug blocks 4 and 5, respectively. The lower buss bars 8 and 9 are formed at their outer sides with laterally-extending electrical contact plates 19 and 20, respectively, which extend into the inner end portions of the plug openings 6 and 7 adjacent the lower walls of said openings, respectively. The upper buss bars 10 and 11 are formed at their outer sides with laterally-extending electrical contact plates 21 and 22, which extend into the inner end portions of the plug openings 6 and 7 adjacent the upper walls of said openings, respectively. From the upper edges of two opposite ends of the lower section 13 of the casing 12 extend two external flanges 23 and one external flange 24, respectively, and from the lower edges of said opposite ends of the upper section 14 of the casing 12 extend two external flanges 25 and one external flange 26 adapted to rest upon said two flanges 23 and said one flange 24, respectively, of said lower section 13 of the casing 1, and said registering flanges 23 and 25 and 24 and 26 are detachably secured together by screws 27 and 28, respectively. The electric cable inlet duct 15 is formed in one end of the casing 12 with two complementary conical outwardly projecting members 29 and 30, projecting outwardly from registering end walls 31 and 32 of the casing 12, the upper side 33 of the lower member 29 and the lower side 33' of the upper member 30 of said cable inlet duct 15 being semi-circular in form, and form a complete circular inner wall 34 extending through an end wall 31 and 32 of the lower and upper sections 31 and 32 of the casing into the buss bar space 18 between the plug insulation blocks 4 and 5, through which inner circular wall 34 of the cable duct 15 extends the electrical conductor cable 16 into said buss bar space 18. Through said cable 16 extend the insulated electric conductor wires 35, 36 and 37, the inner end of the wire 35 being connected at 35' to the connecting member 17 of the lower buss bars 8 and 9, the inner end of the wire 36 being connected at 36' to a lug 10' on the inner side of the upper buss bar 10 and the inner end of the wire 37 being connected at 37' to a lug 9' on the inner side of the buss bar blocks 4 and 5.

Each thick electrical connecting plug 2 includes a body of insulation 40, on which the electrical connecting parts of the plug are mounted, which body is of such size that it may be inserted into one of the plug sockets 6 or 7. At the forward inner end of said body 40 of insulation and at the lower and upper edges of said body are mounted a lower contact member 41 and an upper contact member 42, which contact members are bent transversely inwardly of the plug at their forward ends into end members 43 and 44, respectively, and said end members 43 and 44 are then bent rearwardly from the inner ends at 45 and 46, respectively, into notches 47 and 48, respectively, in the forward end of the insulation plug body 40. The rear end members 49 and 50 of the contact members 41 and 42, respectively, are bent transversely inwardly into recesses 51 and 52 in opposite edges of the plug 4, and the inner ends of the rear end members 49 and 50 are bent rearwardly in said recesses 51 and 52, respectively, into rearwardly-extending flanges 53 and 54, respectively. In each plug 4, near the lower and upper edges thereof are provided longitudinal bores 55 and 56, respectively, extending forwardly in said plugs to the recesses 51 and 52, respectively, in the forward ends of which bores are located spring cages 57 and 58, respectively. From the forward ends of said cages extend flanges 59 and 60, respectively, adjacent the outer sides of the contact flanges 53 and 54, respectively, and the cage flanges 59 and 60 are secured to the contact flanges 53 and 54 by screws 61 and 62, respectively, which are driven through the flanges 59 and 53 and 60 and 54, respectively, and into the plug body 40. Plungers 63 and 64 extend through the rear ends of the cages 57 and 58, respectively. The plungers 63 carry on their forward ends heads 65, in the rear ends of the cages 57, which heads 65 bear against the rear ends of springs 66 in the cages 57, while the forward ends of said springs 66 engage the forward end walls of said cages 57. On the rear outer ends of the plungers 63 are secured heads 67 in the bores 55, which heads are engaged by the forward ends of fuses 68 located in said bores 55 rearwardly of said plunger heads 67. The plungers 64 carry on their forward ends heads 69, in the rear ends of the cages 58, which heads bear against the rear ends of the springs 70 in said cages 58, while the forward ends of said springs 70 engage the forward end walls of said cages 58. On the rear outer ends of the plungers 64 are secured heads 71 in the bores 56, which heads are engaged by the forward ends of the fuses 72 located in said bores 56 rearwardly of said plunger heads 71. In the rear ends of the plugs 2, rearwardly of the rear ends of the fuses 68 and 72, are located an insulation block 73 into which extends the forward ends of electric cables 74 through which extends two insulated wires 75 and 76, the forward outer ends of which wires are connected to two screws 77 and 78, which are coaxial with the fuses 68 and 71, and the heads 79 and 80 on the forward ends of said screws 77 and 78, respectively, bear against the rear ends of the fuses 68 and 72, respectively, and hold said fuses in compression between said screw heads 79 and 80 and the rear plunger heads 68 and 71 against the tension of the cage springs 66 and 70, respectively, thus providing positive electrical contact between the ends of said fuses and adjacent contacts of electric light circuits such as required in motion picture studios. The screws 77 and 78 are driven into the forward side of the insulation block 73 adjacent the ends of the wires 75 and 76, respectively, and the heads 79 and 80 of said screws clamp the ends of said wires against the forward side of said insulation block 73. In the lower and upper edges of the insulation block 40 are provided sockets 81 and 82 in which are located springs 83 and 84, respectively, which bear outwardly against the edge contact members 41 and 42 and press said contact members resiliently against the contact plates 19 and 21, respectively, of the buss bars 8 and 10, respectively.

Over the rear end of each thick plug 2 fits a metal cap 85, which is detachably secured in position over said end of the plug by a single screw 86, which is extended through one side wall of said cap 85, through the rear end of the plug 2, through the insulating block 73, and through the opposite wall of the cap 85, there being a conical head 87 on one end of said screw engaging a side wall of the cap 85, while the other end of the screw is threaded at 88 in the opposite side wall of said cap, while the screw extends through openings in the rear end of the plug 2 and an opening through the insulation block 73. The single screw 86 holds the insulation block 73 and the fuses 68 and 72 assembled in the rear part of the plug 2. Upon unthreading the screw from the cap 85, the screw may be withdrawn from the plug, the electric cable 74, insulation block 73, and the fuses 68 and 72 may be removed from the plug through its rear end.

Each of the thin plugs 3 of each pair of said plugs includes a plug body of insulation 90, on which the electrical connecting parts of the plug are mounted, which body is of such size that it may be inserted into one of the plug sockets 6 or 7. At the forward end of said body 90 of insulation on the lower and upper edges thereof are mounted a lower contact member 91 and an upper contact member 92, respectively, which contact members are bent inwardly at their forward ends into forward end members 93 and 94, respectively, and are bent rearwardly at the inner ends of said end members 93 and 94 into rearwardly extending engaging members 95 and 96, respectively, extending into notches 97 and 98, respectively, in the forward end of the body 90 of the plug 3. The rear ends of the lower and upper contact members 91 and 92 are bent transversely inwardly into rear and fixed contacts 99 and 100, which extend into transverse slots 101 and 102, respectively, in the lower and upper edges of the plug body 90 of the plug 3. In the lower and upper edges of said plug body 90 are provided sockets 103 and 104, respectively, in which sockets are located springs 105 and 106, respectively, which springs bear outwardly against the contact members 91 and 92, respectively, and force the rear ends of said contact members outwardly into electrical contact with the contact plates 20 and 22 or 19 and 21, of the buss bars 9 and 11 or 8 and 10, located adjacent the lower and upper walls of plug openings 7 or 6, respectively. The insulation body 90 of each plug 3 is provided with two longitudinally extending bores 107 and 108, in which are fitted spring cages 109 and 110, respectively, in which cages are located springs 111 and 112, respectively. From the forward ends of said cages 109 and 110 project plunger contacts 113 and 114, respectively, into engagement with the rear end members 99 and 100 of the lower and upper contact members 91 and 92, respectively. Rearwardly of the cage bores 107 and 108, the insulation body 90 of each plug 3 is provided with larger aligned fuse bores 115 and 116. Plungers 117 and 118 extend through the rear ends of the cages 109 and 110, respectively, and heads 119 and 120 are secured on the forward ends of said plungers 117 and 118 in the cages 109 and 110, respectively, which plungers engage the rear ends of the springs 111 and 112 in said cages, respectively. The forward ends of said springs 111 and 112 engage the forward end portions of said cages 109 and 110, respectively. On the rear ends of the plungers 117 and 118 are secured heads 121 and 122 on the rear ends of said plungers, respectively, in the forward ends of the bores 115 and 116, respectively, which heads 121 and 122 engage the forward ends of fuses 123 and 124, respectively, in the bores 115 and 116, respectively.

In the rear end of the insulation plug body 90, and extending through the outer side of each plug 3 is provided a large recess 125, to which the fuse bores 115 and 116, rearwardly extend, and an insulation block 126 fits in said recess 125 against the rear end of the insulation block 90 and over the rear ends of the fuse bores 115 and 116, respectively. An electric cable 127 extends into the rear outer end of the insulation block 126, through which cable extend a pair of insulated wires 128 and 129, which extend to two screws 130 and 131, respectively, which screws extend rearwardly into the insulation block 126 past the inner ends of said wires 128 and 129, respectively, and on the forward ends of said screws 130 and 131 are secured heads 132 and 133, which heads engage and clamp the inner ends of said wires 128 and 129, respectively, and clamp said ends of said wires against the forward end of said insulation block 126. Said screw heads 132 and 133 extend forwardly into the rear ends of the fuse bores 115 and 116, respectively, and constitute fixed abutments, against which the rear ends of the fuses 123 and 124 abut, respectively. The outer side wall 134 of each plug body 90 is provided with an opening 135 formed with a forward extension 136, and said outer side wall 134 of the plug 3 is formed with a short forwardly extending depression 138, extending forwardly from the forward extension 136 of the recess opening 135. The cable 127, extending into the rear end of the insulation block 126 extends laterally outwardly from the outer surface of said block, through the opening 135 and its extension 136 in the outer side wall 134 of the plug 3, and a clamp plate 137 extends across and slightly forwardly over the forward end portion of said cable 127, which clamp plate 137 is shaped to fit in the opening 135, its extension 136 and in the depression 138 in said outer side wall 134, and the wide rear portion of said clamp plate 137, extending across the cable 127, is secured at opposite sides of said cable by two screws 139 and 140, respectively, which extend through said clamp plate 127 into threaded engagement with the insulation block 126, while the clamp plate 127, insulation block 126, and the forward end of the cable 127, are detachably secured in the rear end of the plug 3 by a single screw 141 which extends laterally inwardly from the outer side of each plug block 3 through the forward end of the clamp plate 137, screw bore 142 in the insulation plug body 90 into threaded engagement at its remote end with a nut 143 in the inner side of said plug body 90, the head of said screw 141 engaging the outer side of said clamp plate 137 and holding the forward end of said plate in the depression 138 in the outer side of the plug 3.

Upon unthreading the screw 141 from the nut 143 and removing said screw from the plug 3, the cable 127, insulation block 126 and clamp plate 127, and fuses 123 and 124 may be dropped out of the body 90 of the plug 3 through the rear end thereof and the blown fuses may be readily replaced with new fuses in a minimum of time, thus avoiding long and expensive delays in replacing blown fuses in lighting circuits during the production of motion pictures.

The use of only one screw is a great advantage over the use of a plurality of screws in assembling or disassembling the plugs for replacing fuses therein or making other repairs, during the production of motion pictures, where many actors and other crafts are employed, thus effecting a great saving in time and production costs.

I claim:

1. An electrical plug connection for junction boxes including an electrical junction box constructed and arranged with electrical contacts to receive electrical plug connections, an electrical plug connection comprising a plug body, electrical contacts on said plug body to engage said electrical contacts in said junction box when said plug connection is plugged into said junction box, spring cages connected to said plug body contacts, respectively, springs in said cages, respectively, cage plungers extending through the rear ends of said cages, respectively, heads on the forward ends of said cage plungers, respectively, with said heads in the rear ends, said cages bearing against the rear ends of said springs in said cages, respectively, heads on the rear ends of said plungers, respectively, fuses in the rear portion of said plug body engaging at their forward ends the heads on the rear ends of said cage plungers, respectively, an insulation block in the rear end of said plug body, into the rear end of which insulation box extends a cable, insulated electrical wires extending forwardly through said electrical cable, and said insulation block, to the forward side of said insulation block, screws threaded into the forward side of said insulation block, heads on the rear ends of said screws engaging and clamping the ends of said cable wires against the forward side of said insulation block, said clamp screw heads being positioned on the front side of said insulation block for engaging the rear ends of said fuses, respectively, a cap fitted over the rear end of said plug body, and over said insulation block, opposite side walls of said cap, at opposite sides of the rear end of said plug body and said insulation block being provided with registering screw apertures, and a single screw extending transversely through the rear end of said plug and through said screw apertures, with the head on one end of said screw engaging one side wall of said cap, and the other end of said screw being threaded in the opposite side wall of said cap for detachably holding said cap on the rear end of said plug body, and for detachably holding said insulation block, cable, cable wires and wire clamp screw heads in position with said screw heads engaging the rear ends of said fuses, and holding the forward ends of said fuses in spring-pressed electrical contact with the rear heads of said cage spring plungers, all of which parts in the rear part of said plug body rearwardly of said cages, including said fuses, being removable from the rear end of said plug body by removing said single screw from said rear cap, rear end of said plug body and said insulation block.

2. An electrical plug connection for junction boxes including an electrical junction box constructed and arranged with electrical contacts to receive electrical plug connections, an electrical plug connection comprising a plug body, electrical contacts on said plug body to engage said electrical contacts in said junction box, when said plug connection is plugged into said junction box, spring cages connected to said plug body contacts, respectively, springs in said cages, respectively, cage plungers extending through the rear ends of said cages, respectively, heads on the forward ends of said cage plungers, respectively, with said heads in the rear ends, said cages bearing against the rear ends of said springs in said cages, respectively, heads on the rear ends of said plungers, respectively, fuses in the rear portion of said plug body engaging at their forward ends of the heads on the rear ends of said cage plungers, respectively, an insulation block in the rear end of said plug body, into the rear end of which insulation block extends a cable, insulated electrical wires extending forwardly through said electrical cable, and said insulation block, to the forward side of said insulation block, screws threaded into the forward side of said insulation block, heads on the rear ends of said screws engaging and clamping the ends of said cable wires against the forward side of said insulation block, said clamp screw heads being positioned on the front side of said insulation block for engaging the rear ends of said fuses, respectively, a cap fitted over the rear end of said plug body, and over said insulation block, opposite side walls of said cap, at opposite sides of the rear end of said plug body and said insulation block being provided with registering screw apertures, and a single screw extending through said screw apertures, with the head on one end of said screw engaging one side wall of said cap, and the other end of said screw being threaded in the opposite side wall of said cap for detachably holding said cap on the rear end of said plug body, and for detachably holding said insulation block, cable, cable wires and wire clamp screw heads in position with said screw heads engaging the rear ends of said fuses, and holding the forward ends of said fuses in spring-pressed electrical contact with the rear heads of said cage spring plungers, all of which parts in the rear part of said plug body rearwardly of said cages, including said fuses, being removable from the rear end of said plug body by removing said single screw from said rear cap, rear end of said plug body and said insulation block.

3. The combination of an electrical junction box and an electrical connecting plug therefor, said junction box being constructed with a pair of electrical contacts, said plug being constructed with a pair of forward and electrical contacts for engaging said junction box contacts, when said connecting plug is plugged into said junction box, said plug including a pair of fuses, the rear end of said plug being provided with a recess, at one side of which recess is provided an opening in the corresponding said wall of said plug, leading from said side of said recess out through said corresponding side wall of said recess, an insulation block detachably fitted in said recess, an electrical cable leading into said insulation block through the rear end of said block, which cable extends laterally outwardly from said side of said insulation block through said opening leading from said side of said recess, two insulated wires leading through said cable beyond the inner end of said cable into the inner forward end of said insulation block, screws extending rearwardly into said insulation block, heads on the forward ends of said screws for engaging and clamping the ends of said cable wires in the forward inner end of said insulation block, the forward inner sides of said screw heads engaging the rear ends of said fuses, respectively, and holding the forward ends of said fuses in electrical contact with the forward end plug contacts for engaging the junction box contacts, and a clamp plate extending across the laterally outwardly extending portion of said electrical cable in said recess opening in said side wall of said recess in said side of said plug body, screws extending through said plate at the sides, respectively, of said cable through said cable opening into said insulation block, for securing said cable in said block, and a single screw extending through said clamp plate into said plug for detachably holding said insulation block, cable, and fuses within the rear portion of said plug.

References Cited in the file of this patent

UNITED STATES PATENTS

| | | |
|---|---|---|
| 2,063,723 | Brody | Dec. 8, 1936 |
| 2,257,608 | Keefe | Sept. 30, 1941 |
| 2,404,407 | Seurynck | July 23, 1946 |
| 2,424,405 | Lytgens | July 22, 1947 |
| 2,477,360 | Bright | July 26, 1949 |
| 2,516,148 | Rose et al. | July 25, 1950 |
| 2,599,023 | Shaul | June 3, 1952 |